United States Patent [19]

Watanabe et al.

[11] 4,044,455

[45] Aug. 30, 1977

[54] METHOD OF MAKING A PRINTING HAMMER UNIT

[75] Inventors: Satoshi Watanabe, Inagi; Atsuo Tsunoda, Fuchu; Takeshi Kimura; Hitoshi Narita, both of Chichibu, all of Japan

[73] Assignees: Canon Kabushiki Kaisha, Tokyo; Canon Denshi Kabushiki Kaisha, both of Japan

[21] Appl. No.: 690,925

[22] Filed: May 28, 1976

[30] Foreign Application Priority Data

| | | |
|---|---|---|
| June 5, 1975 | Japan | 50-68028 |
| June 5, 1975 | Japan | 50-68029 |
| June 5, 1975 | Japan | 50-68030 |
| June 5, 1975 | Japan | 50-68031 |

[51] Int. Cl.$^2$ .......... B23P 17/00

[52] U.S. Cl. .......... 29/592; 29/418; 101/93.29; 264/274; 264/275

[58] Field of Search .......... 29/592, 413, 414, 418; 101/93.29, 93.30, 93.31; 264/272, 273, 274, 275

[56] References Cited

U.S. PATENT DOCUMENTS

| | | | |
|---|---|---|---|
| 1,161,191 | 11/1915 | Cook | 29/418 |
| 2,838,834 | 6/1958 | Ganine | 29/418 X |
| 3,763,544 | 10/1973 | Gibson, Jr. | 29/418 X |
| 3,859,712 | 1/1975 | Tramposch | 29/418 |
| 3,921,277 | 11/1975 | Tramposch | 29/418 |

FOREIGN PATENT DOCUMENTS

| | | | |
|---|---|---|---|
| 1,201,085 | 8/1970 | United Kingdom | 101/93.29 |

*Primary Examiner*—Victor A. DiPalma
*Attorney, Agent, or Firm*—Fitzpatrick, Cella, Harper & Scinto

[57] ABSTRACT

A printing hammer unit is produced by forming a group of hammers having hammer portions secured to resilient members of electrically conductive material connected together by connecting portions and also forming a base integrally secured to the resilient members at locations thereof spaced apart from the hammer portions, and by removing at least a part of the connecting portions to break the electrical connection between at least one of the resilient members secured to the hammer portions and the other resilient members.

17 Claims, 24 Drawing Figures

METHOD OF MAKING A PRINTING HAMMER UNIT

BACKGROUND OF THE INVENTION

1. Field of the Invention

This invention relates to a method of making a printing hammer unit having a plurality of printing hammers secured together, and, more particularly, to a printing hammer unit having a plurality of printing hammers held by resilient members.

2. Description of Prior Arts

There has been widely known a printer of a type, in which a character wheel or belt having characters arranged therearound or thereon is rotated or moved, and the characters on the character wheel or belt are impacted by printing hammers on recording paper interposed between the character holding member and the printing hammers to thereby record the characters on the recording paper.

Further, a printer having such hammers held by springs studded on a base has already been proposed by the applicant in U.S. application Ser. No. 565,225.

In these printers, a plurality of printing hammers must be disposed in juxtaposed relationship when printing is to be effected in a plurality of columns. The plurality of printing hammers so used must have a uniform hammer movement characteristic (or stroke) so as to secure uniform concentration and fixed position of the printed characters from line to line. It is also desirable that such a group of hammers be easily and accurately set. Particularly, in the printers of the above-described type, wherein the printing hammers are held by springs, it is preferable that the spring to drive each printing hammer has a uniform resiliency to secure uniform printing strokes.

SUMMARY OF THE INVENTION

It is an object of the present invention to provide a method of making a hammer unit, in which a plurality of printing hammers are secured in a uniform condition.

It is another object of the present invention to provide a method of making a hammer unit, in which the printing hammers are secured with high precision.

It is still another object of the present invention to provide a method of making a hammer unit in which the printing hammers can be secured at low cost.

It is yet another object of the present invention to provide a method of making a hammer unit, in which the plurality of printing hammers have a uniform movement characteristic.

Other objects and features of the present invention will become more fully apparent from the following detailed description taken in conjunction with the accompanying drawings.

BRIEF DESCRIPTION OF THE DRAWINGS

FIGS. 11A, 11B and 11C show general arrangement of the spring base plates for illustrating the method of making the hammer unit according to another embodiment of the present invention, wherein FIG. 11A is a front view, FIG. 11B is an exploded perspective view, and FIG. 11C is a front view of a spring base plate S having the hammer portions and the base portion secured thereto;

FIGS. 12A and 12B are for illustrating the method of making the hammer unit according to still another embodiment of the present invention, wherein FIG. 12A is a front view of the spring base plate S, and FIG. 12B is a front view of the spring base plate S having the hammer portions and the base portion secured thereto;

FIGS. 13A through 13E are for illustrating the method of making a hammer unit according to yet another embodiment of the present invention, wherein FIG. 13A is a front view of the spring base plate, FIG. 13B is a front view of the spring base plate having the hammer portions secured thereto, FIG. 13C is a front view of the spring base plate S having the hammer portions and the base portion secured thereto, FIG. 13D is a cross-sectional view showing the spring base plate fixed within a metal mold for forming the hammer portions, and FIG. 13E is a cross-sectional view showing the spring base plate fixed within a metal mold for forming the base.

DESCRIPTION OF THE PREFERRED EMBODIMENTS

Before the invention is described, a printer with which the printing hammer unit produced according to the present invention is suitable for use will first be described.

Figure 1:
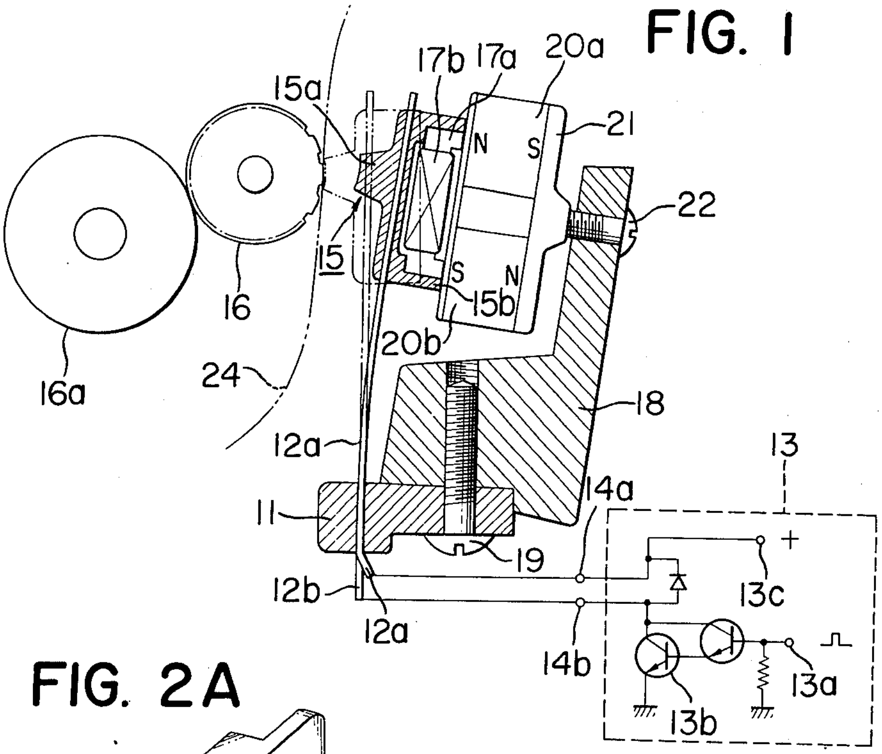
FIG. 1 is a cross-sectional view of a printer, to which the hammer unit fabricated according to the present invention is applied.
Figure 2A:
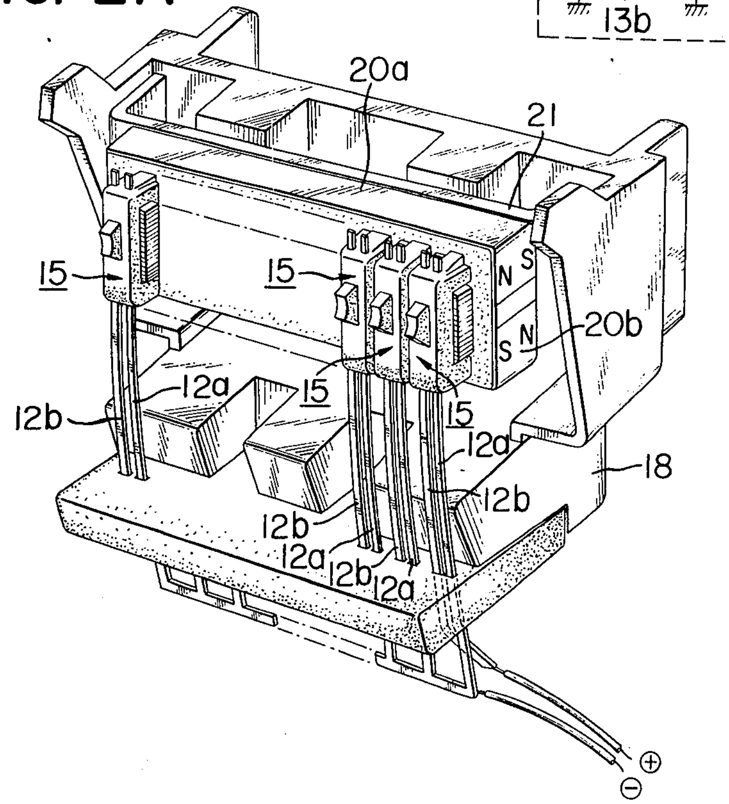
FIG. 2A is a perspective view of the hammer unit having an electromagnet secured to each of the hammers, and permanent magnets, as shown in FIG. 1.

Referring to FIGS. 1 and 2, a base 11 formed of an insulative material such as plastics or the like has a plurality of leaf springs **12*a* and 12*b* disposed alternately and studded at predetermined intervals therein. The portions of the leaf springs 12*b* which are projected downwardly of the base 11 are electrically connected together and further connected to a hammer driving circuit 13, while the portions of the leaf springs 12*a* which are projected downwardly of the base 11 are individually connected to the hammer driving circuit 13. Thus, such hammer driving circuit 13 is provided in correspondence to each of the hammers which will later be described, and the leaf springs 12*a* are connected to the terminals 14*a* of the respective hammer driving circuits 13, while the leaf springs 12*b*** are commonly connected to the terminals 14*b* of the respective hammer driving circuits 13.

Secured to the portions of the leaf springs 12*a* and 12*b* which are projected upwardly of the base 11 is a hammer portion 15 of plastic material for each set of adjacent leaf springs 12*a* and 12*b*. Each of such hammer portions 15 comprises an impacting section 15*a* for impacting a character wheel 16 to be described and a holding section 15*b* for holding an electromagnet 17 to be also described.

Figure 3:
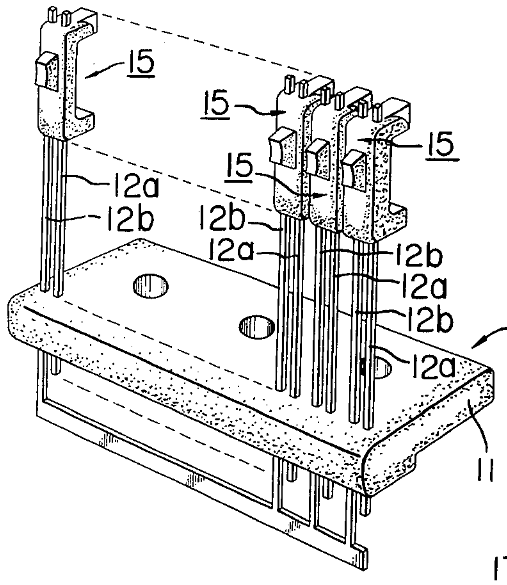
FIG. 3 is a perspective view of the hammer unit.

These hammer portions 15, leaf springs 12*a*, 12*b* and base 11 together constitute a hammer unit 10 (see FIG. 3), and a further base 18 is secured to the base 11 of the hammer unit 10 by means of a screw 19. A base portion 21 having a pair of permanent magnets 20*a* and 20*b* secured thereto is secured to the base 18 by means of a screw 22.

The permanent magnets 20*a* and 20*b* are made larger than the length of each hammer portion 15 and are disposed substantially parallel on the base portion 21. These permanent magnets 20*a* and 20*b* are magnetized with mutually opposite polarities as shown by the letters U and S in FIGS. 1 and 2.

Figure 4:
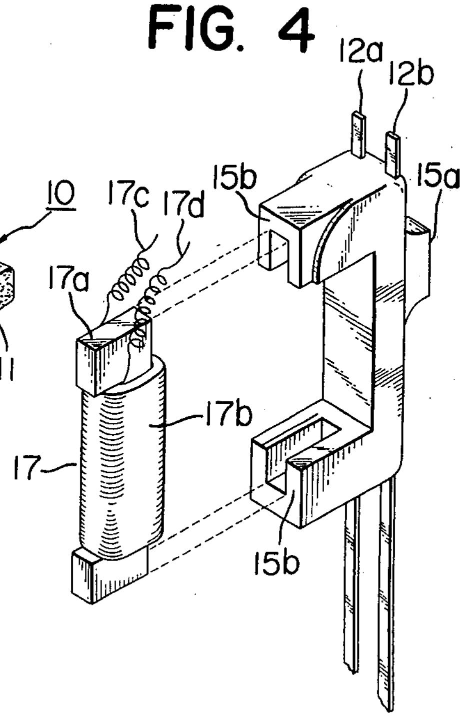
FIG. 4 is a perspective view for illustrating how the permanent magnet is secured to the corresponding hammer portion.

An electromagnet 17, which may be securely inserted in the holding section 15*b* of each hammer portion, as seen in FIG. 4, comprises a metal core 17*a* and a coil 17*b* wound thereon. After the electromagnet 17 is inserted in and secured to the holding section 15*b*, the leads 17*c* and 17*d* of the coil 17*b* are electrically connected to the leaf springs 12*a* and 12*b*, respectively.

It should be noted that the permanent magnets 20*a*, 20*b* and the hammer portions 15 are positioned relative to each other so that, when no hammer driving signal is applied to the hammer driving circuit 13, the core 17*a* is attracted to the permanent magnets 20*a* and 20*b* against the spring forces of the leaf springs 12*a* and 12*b*, as indicated by solid lines in FIG. 1. In other words, when the permanent magnets 20*a* and 20*b* are inactive, the leaf springs 12*a* and 12*b* maintain their upright positions as indicated by dotted lines in FIG. 1.

Figure 2B:
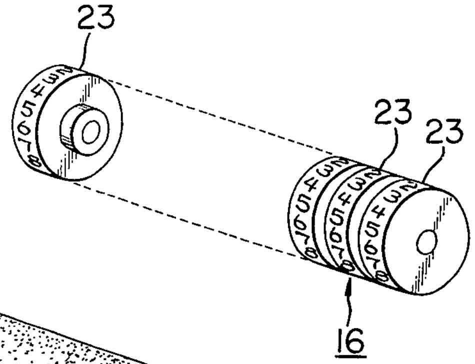
FIG. 2B is a perspective view of a character wheel.
Figure 2C:
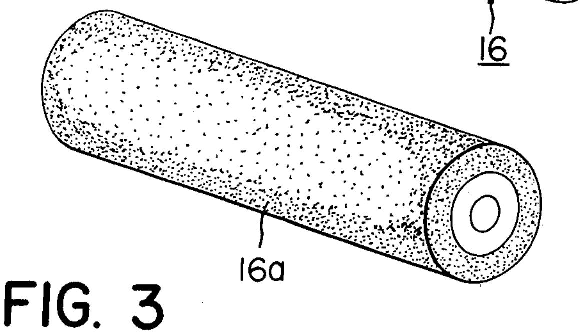
FIG. 2C is a perspective view of an ink roller.

A character wheel 16 is arranged in correspondence to such hammer portions 15, as shown in FIG. 1. Provided on the character wheel 16 (a perspective view of which is shown in FIG. 2B) are character rings 23 corresponding to the respective hammer portions 15 and each having a ring of characters thereon, and an ink roller 16*a* (the perspective view of which is shown in FIG. 2*c*) impregnated with ink and arranged in contact with the character wheel 16. The ink roller is best seen in the perspective view of FIG. 2C.

In the so constructed printer, application of a pulse signal to a terminal 13*a* of the hammer driving circuit 13 turns on a transistor 13*b* to permit a current to flow from a terminal 13*c* to ground through the coil 17*b* and the transistor 13*b*.

Since the coil 17*b* of the electromagnet 17 is so wound that when a current flows as described above, the upper portion of the core 17*a* in FIG. 1 may be magnetized in the north pole while the lower portion be magnetized in the south pole (in other words, the same polarities as those of the permanent magents 20*a* and 20*b* which are opposed to the core 17*a*), application of a pulse signal as described above causes the magnetic flux from the permanent magnets 20*a* and 20*b* to be offset by the electromagnet 17 so that the hammer portion 15 is moved leftward to a dotted-line position as shown in FIG. 1 by the force of the leaf springs 12*a* and 12*b*, and hits the character wheel 16 through a recording paper 24 interposed between the character wheel and the hammer portion.

The pulse width of the aforesaid pulse signal is selected such that application of the current to the coil 17*b* is discontinued at the end of the impact by the hammer portion. Therefore, as soon as the impact is completed, the hammer portion 15 is again attracted by the permanent magnets 20*a* and 20*b* to return to its initial position.

Thus, by rotatively driving the character wheel 16 at a predetermined speed, and by causing the current as described above to flow through the coil 17*b* of the hammer portion 15 when a desired numeric character has come to face the hammer portion, it is possible to cause the impacting section 15*a* of the hammer portion 15 to impact the character wheel 16 through the recording paper 24 interposed therebetween.

In the above-described printer, it is preferable that the hammer portions be secured to a group of leaf springs 12*a* and 12*b* in an identical manner, that some of the leaf springs 12*a* and 12*b* be secured to the base in an identical manner, and that the securing be accomplished easily. In other words, it is preferable that the hammer unit comprising the hammer portions 15, leaf springs 12*a*, 12*b* and base 11 be accurately and easily formed and that the individual hammer portions have a uniform movement characteristic.

Figure 5:
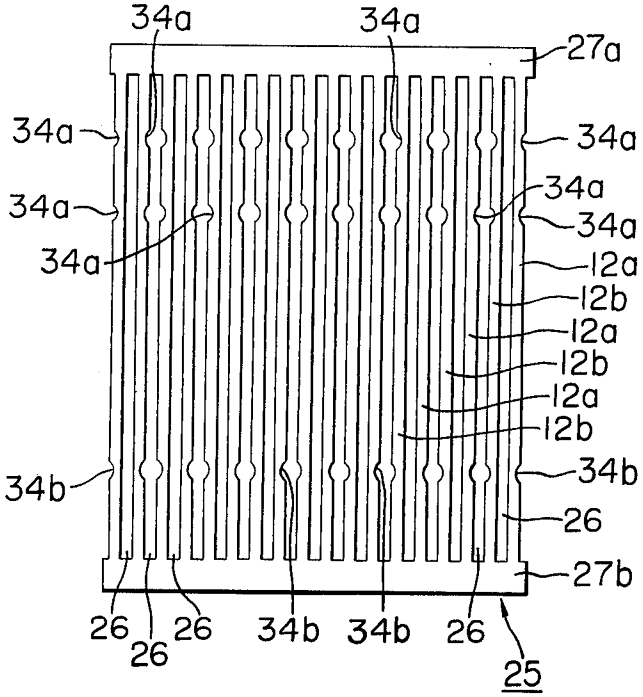
FIG. 5 is a front view of a spring base plate.
Figure 6:
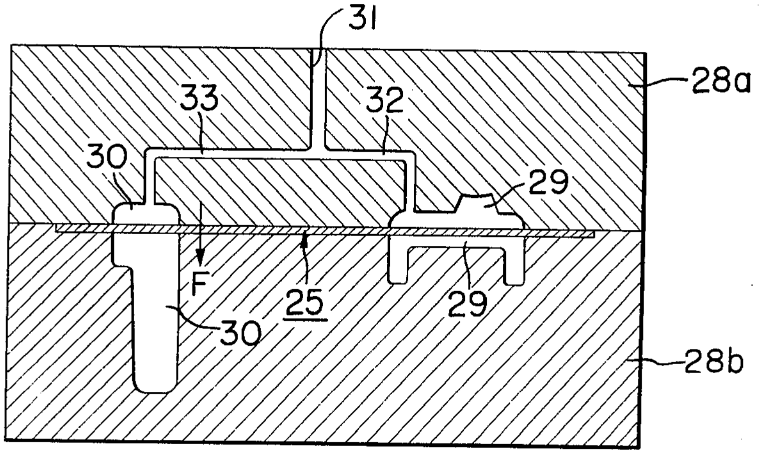
FIG. 6 is a cross-sectional view showing the spring base plate fixed in a metal mold.
Figure 7:
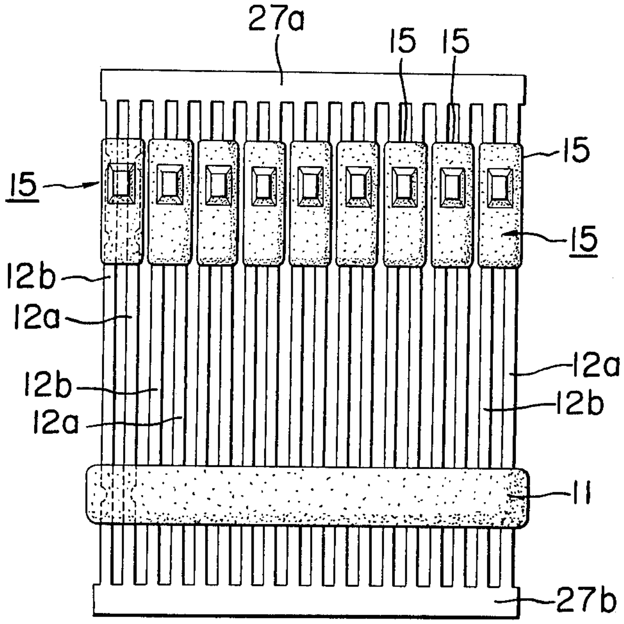
FIG. 7 is a front view of the hammer portions and base portion secured to the spring base plate.

The present invention is concerned with a method of making such a hammer unit and will now be described in detail by reference to the drawings. FIG. 5 shows a leaf spring base plate 25 comprising a multiplicity of leaf springs connected together. This leaf spring base plate 25 may be provided by forming slits 26 of a predetermined length at predetermined intervals in a metal plate to thereby form a plurality of leaf springs 12*a* and 12*b* having their upper and lower ends respectively connected together at end edge portions 27*a* and 27*b* (connecting portions). Such a leaf spring base plate 25, as is shown in FIG. 6, is fixedly disposed between the upper metallic mold half 28*a* and the lower metallic mold half 28*b* of a plastics molding machine. The metallic mold 28 shown in FIG. 6 is provided with a plastics casting cavity 29 for forming the hammer portion secured to a pair of leaf springs 12*a* and 12*b* (FIG. 6 shows only one such cavity, but actually a number of such cavities corresponding in number to the hammer portions shown in FIG. 7 are arranged in a direction perpendicular to the plane of the drawing sheet), and a plastics casting cavity 30 for forming the base 11. The cavities 29 and 30 are respectively provided with inlet channels 32 and 33 through which the plastic material may be poured from a plastics inlet port 31 to flow to the mold cavities. Such inlet channels 32 are also provided for the other cavities 29 not shown in FIG. 6.

Thus, a charge of plastic material may be poured through the inlet port 31 and after it is solidified, the material may be removed from the metallic mold halves 28*a* and 28*b* and separated from the portion of the solidified plastic material which clogs the inlet channels 32 and 33, whereby a leaf spring base plate 25 of plastic material including the base and hammer portions 15 formed integrally together, as shown in FIG. 7, can be obtained.

The leaf springs 12*a* and 12*b* shown in FIG. 5 have notched portions or cutaways 34*a* and 34*b* at the locations corresponding to the aforementioned hammer portions 15 and base 11, respectively, in order that the hammer portions 15 and base 11 may not move on the leaf springs 12*a* and 12*b* once they have been shaped in the mold. These cutaways are not restrictive forms but protrusions may be formed instead.

Figure 8:
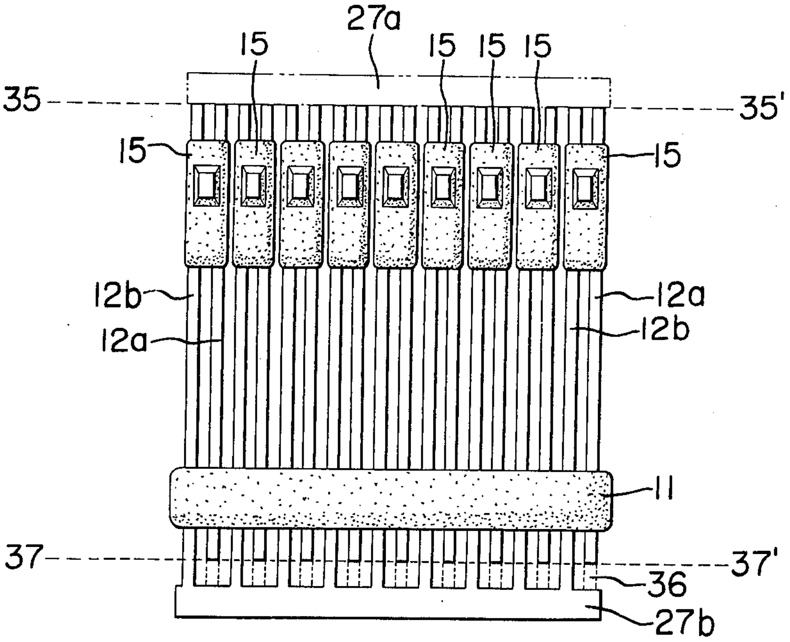
FIG. 8 is a front view of the hammer unit as completed.

After the hammer portions 15 and base 11 have thus been fixed on the leaf spring base plate 25, the base plate is cut along a dotted line 35–35′ to remove the edge portion or lug 27*a*, in the manner as shown in FIG. 8. By the edge portion or lug 27 being so removed, each of the hammer portions 15 is now individually held by a pair of leaf springs 12*a* and 12*b* and free to swing about the point at which each hammer portion is secured to the base 11, as the fulcrum. Also, by disconnecting and removing the leaf springs 12*a* from the end edge portion or lug 27*b*, at the position shown in FIG. 8, the leaf springs 12*b* are now electrically connected together, while the leaf springs 12*a* become electrically independent, and each hammer portion 15 is swingable about the point at which it is secured to the base 11 as the center of oscillation.

Although in FIG. 8, only a portion of each leaf spring 12*a* is removed at the lower portion of the base 11 so as to keep the leaf springs 12*b* connected to the edge portion 27*b*, this edge portion 27*b* need not always be left as such but may be entirely cut off along dotted line 37–37′. In the latter case, however, the leaf springs 12*b* must be electrically connected together by a separate process.

In case the hammer unit is formed by cutting off the edge portions of the leaf springs after the molding of the plastic material in the above described manner, the positions of the leaf springs 12*a* and 12*b* are accurately by the edge portions 27*a* and 27*b*, if the mutual distance between the leaf springs is secured at high precision during manufacturing of the leaf base plate, the hammer unit having such positional precision can be obtained.

Further, the presence of such edge portions 27*a* and 27*b* requires a single leaf spring base plate 25 to be placed within the metallic mold only once, which also facilitates the ease with which the leaf springs are placed within the mold.

The formation of the leaf spring base plate 25 as shown in FIG. 5 may be accomplished by immersing in etching liquid a flat plate with anti-corrosion paint being applied to the areas thereof which do not correspond to the slits 26 thereby to remove only the portions which correspond to the slits, and thereafter removing the applied anti-corrosion paint. Preferably, the application of the anti-corrosion paint as well as the etching liquid may be done on both sides of the flat plate.

Figure 9:
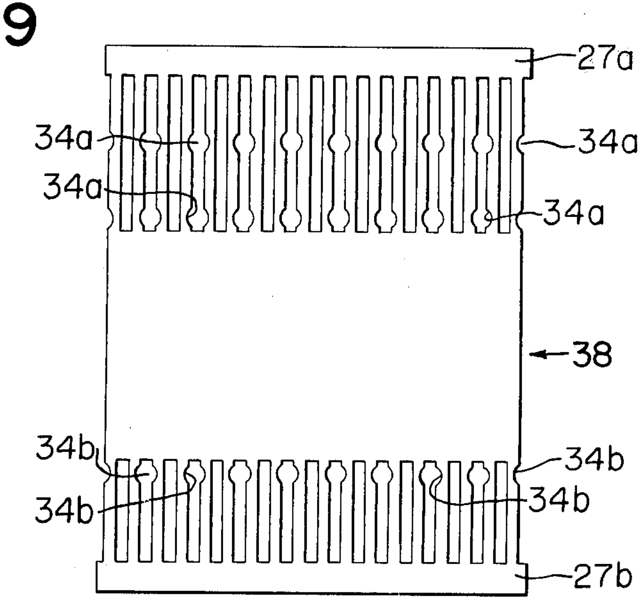
FIG. 9 is a front view of another spring base plate for illustrating the manufacturing process thereof.

An alternative method of making the leaf spring base plate 25 as shown in FIG. 5 is to mechanically punch a flat blank plate. However, because of the fact that the pattern (slits) to be punched out in the leaf spring base plate 25 is fine and complicated throughout the base plate and that the spring plate providing the raw material for the base plate is generally so hard as to make it difficult to machine the punching of a required punching pattern by a single press tends to damage the press tool and, even if the punching operation itself were successful at all, the spring plate would tend to be deformed or broken due to the high shearing stress of the spring plate material. In this consequence, it is difficult to obtain a punched product of good dimensional accuracy which maintains an overall surface flatness. In such a case, therefore, it would be preferably to repeat partial punching in sequence, instead of using a single punching process for the entire portion to be punched in a single operation. More specifically, as shown in FIG. 9, a base plate 38 may first be punched only at the upper and lower parts thereof to form the upper and lower slit portions, and then punched at the central portion, thereby obtaining the leaf spring base plate 25 as shown in FIG. 5.

Figure 10:
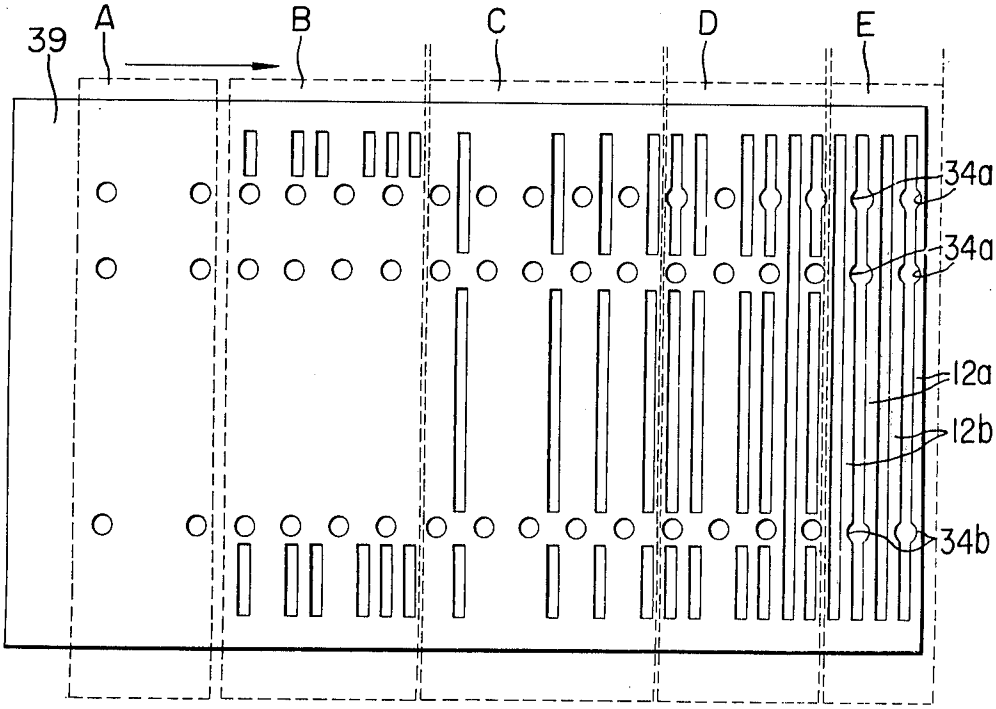
FIG. 10 is a front view of still another spring base plate for illustrating the manufacturing process thereof.

A further alternative is to punch a base plate progressively in the order of A, B, C, D and E as indicated in FIG. 10, whereby the slit patterns as indicated at E or the leaf spring base plate as shown in FIG. 5 may finally be obtained.

Repetition of such partial punching to provide an ultimate required punching pattern reduces the pressure load on the press tool during each pressing process to thereby prevent the tool from being damaged, and also reduces the shearing stress in the spring plate at each pressing process to thereby prevent the spring plate from being deformed or broken, therefore, this method is effective and appropriate in forming a fine and complicated punching pattern throughout a spring plate.

Figure 11A:
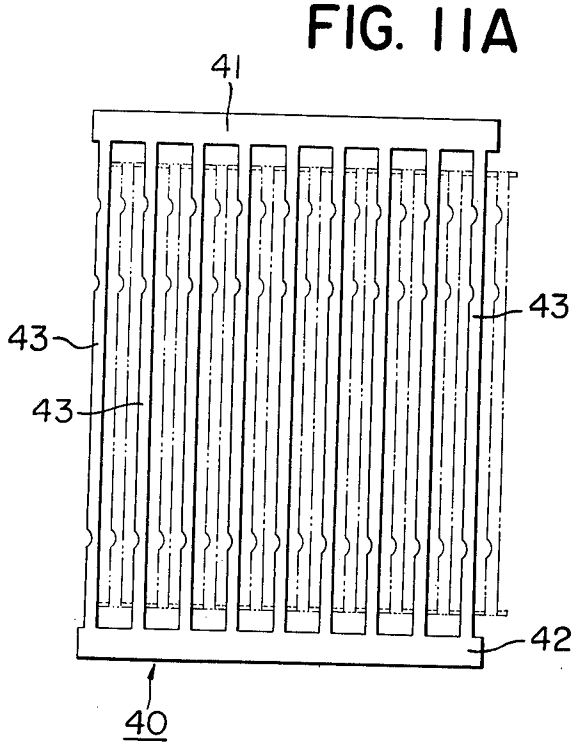

While formation of the leaf spring base plate 25 by either etching or punching a single base plate has hitherto been described, there is available still a further method as shown in FIG. 11. FIG. 11A shows a leaf spring base plate 40 formed either by etching or by punching which has the edge portions 41 and 42 the same as the leaf spring base plate 25 shown in FIG. 5, but this leaf spring base plate 40 differs from the latter in that the pitch of the leaf springs 43 is double that of the leaf springs 12*a* and 12*b* in the leaf spring base plate 25.

Figure 11B:
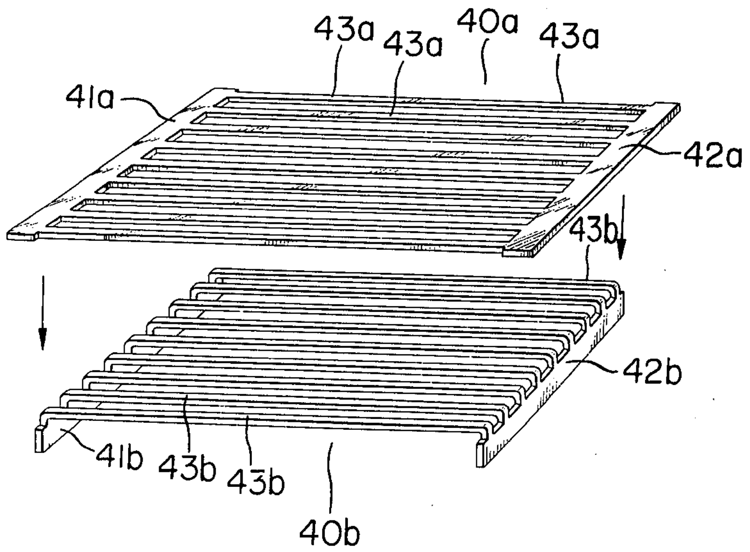
Figure 11C:
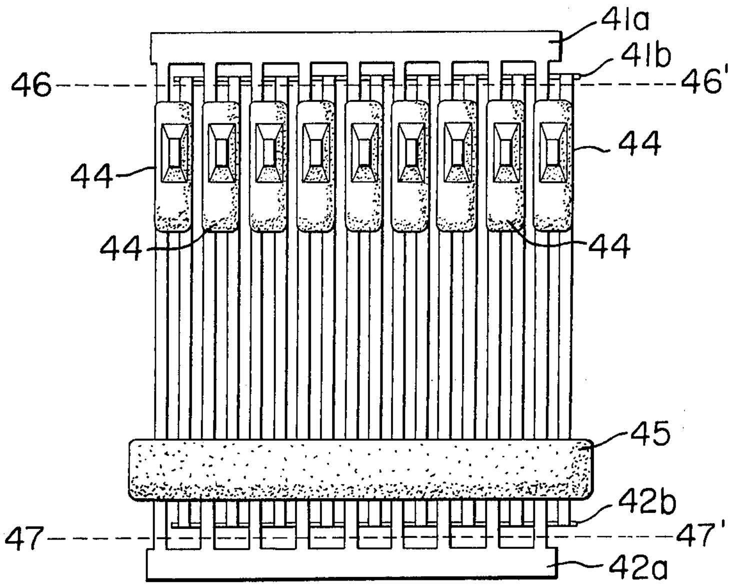

The leaf spring base plate 40 is used in a set of two plates as shown in FIG. 11B, wherein one leaf spring base plate 40*a* is used in its flat form, while the other leaf spring base plate 40*b* is used with the leaf springs 43*b* adjacent to the edge portions 41*b* and 42*b* being bent in the same direction. This is intended for the purpose of enabling the leaf springs 43*a* and 43*b* of the two leaf spring base plates 40*a* and 40*b* to lie on a common plane as will further be described. More specifically, the two leaf spring base plates are disposed between the metallic mold halves 28*a* and 28*b* of FIG. 6 in such a manner that each leaf spring 43*b* lies in the center of the slit formed between adjacent leaf springs 43*a*, while the leaf springs 43*a* and 43*b* lie on a common plane. Thereafter, plastic material is poured into the mold in the same manner as described in connection with FIG. 6, to thereby form the hammer portions 44 and the base 45, after which the molded unit is removed from the metallic mold, whereafter the edge portions 41*a*, 42*a* and 41*b* are cut off along dotted lines 46–46′ and 47–47′ as shown in FIG. 11C, to produce the hammer unit. In this case, the edge portion 42*b* which remains unremoved so as to be used as a common electrode. In the leaf spring base plate as shown in FIGS. 11A and 11B, the pitch of the leaf springs 43 is double that of the leaf springs shown in FIG. 5, as already noted, and this facilitates formation of such a leaf spring base plate 40 by punching.

FIG. 12 shows still another embodiment of the present invention. The leaf spring base plate 48 as used here is formed by previously cutting off one edge portion 41 in the leaf spring base plate 40 shown in FIG. 11A, so that it comprises only one edge portion 49 and leaf springs 50 connected thereto, as in the form of a comb.

Figure 12A:
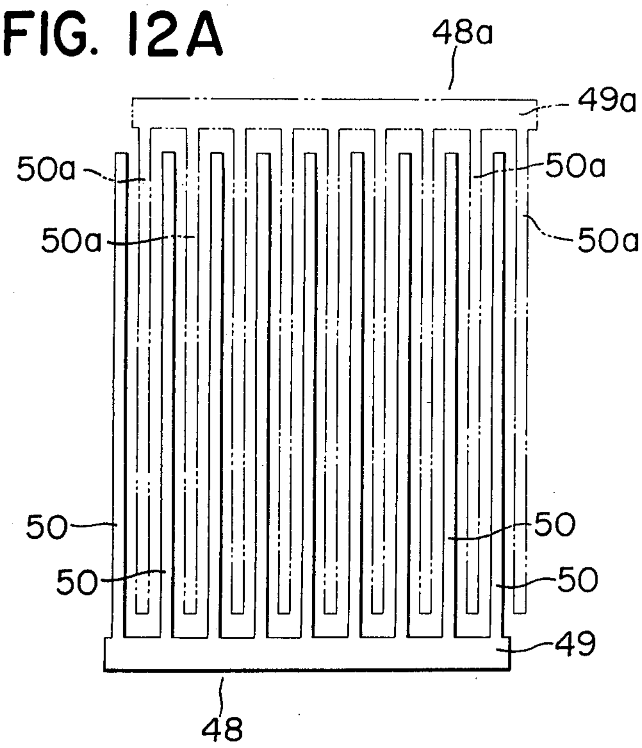
Figure 12B:
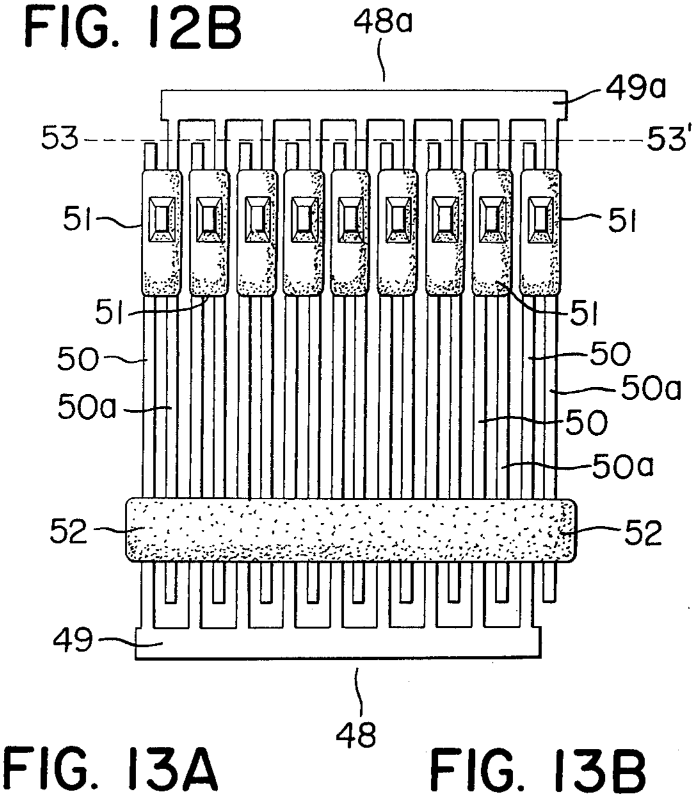

Thus, two leaf spring base plates 48 and 48*a* of the above configuration are arranged in such a manner that the teeth of the leaf springs 50 and 50*a* lie opposite the respective edge portions 49 and 49*a* are mutually inserted into the space interval between the adjacent leaf spring teeth, and at equal intervals and in a common plane as shown by solid and chain lines, after which they are placed between the metallic mold halves 28*a* and 28*b* in FIG. 6, into which plastic material is poured in the same manner as described in connection with FIG. 6 to thereby form the hammer portions 51 and the base 52 as shown in FIG. 12B. Subsequently, the edge portion 49*a* in close proximity to the top part of the beammer portion 51 is cut along a dotted line 53–53' to remove the edge thereby producing the hammer unit as already described. In this case, the edge portion 49 adjacent the base 52 may remain unremoved, so as to be used as a common electrode.

In the manner as explained with respect to FIGS. 11A and 11B, the leaf spring base plate in FIGS. 12A and 12B has, the pitch of the leaf springs 50 and 50*a* is double that of the leaf springs as shown in FIG. 5, and this again facilitates the formation of the leaf spring base plates 48 and 48*a* by punching.

Figure 13A:
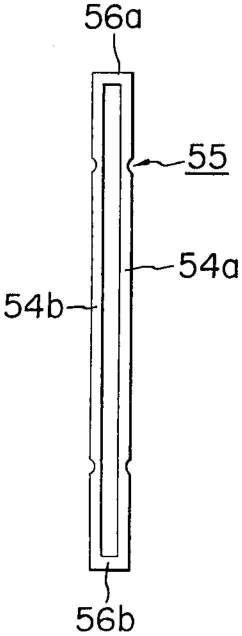
Figure 13B:
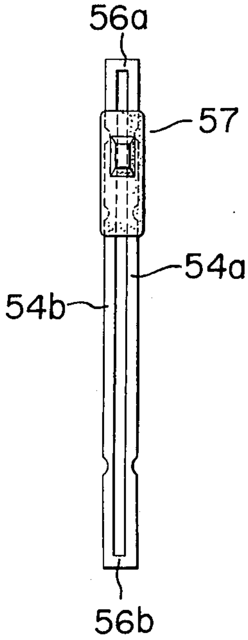

FIGS. 13A and 13B illustrate a further embodiment of the present invention, in which each individual hammer portion is first attached to a pair of leaf springs, whereafter the base is attached to a plurality of pairs of leaf springs, and then the edge portions are cut off.

FIG. 13A particularly shows a leaf spring base plate 55 which comprises a pair of leaf springs 54*a* and 54*b* and end portions 56*a* and 56*b* connecting the leaf springs together. As shown in FIG. 13D, one end part of such leaf spring base plate 55 is fixedly disposed between the upper and lower metallic mold halves 61*a* and 61*b* for forming only the hammer portions followed by pouring of plastic material into a hammer portion forming cavity 62 through a feeding channel 63, thereby producing the leaf spring base plate 55 having the hammer portion 57 integrally formed therewith, as shown in FIG. 13B.

Figure 13C:
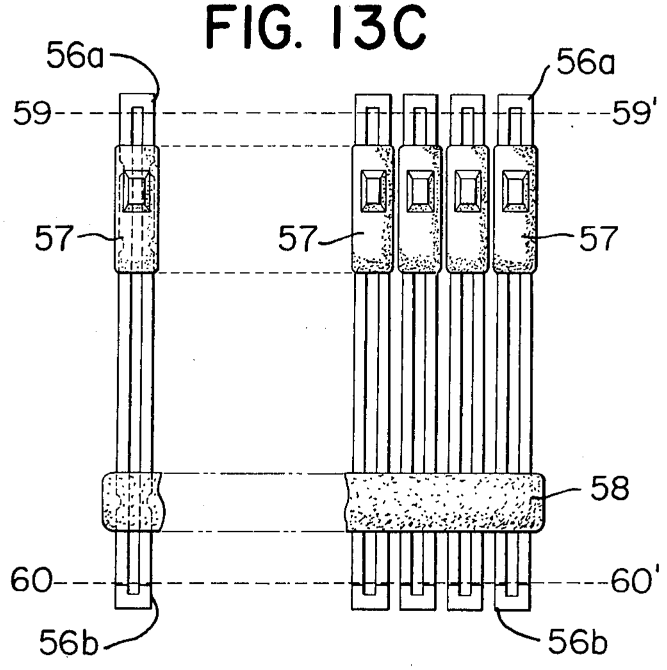
Figure 13D:
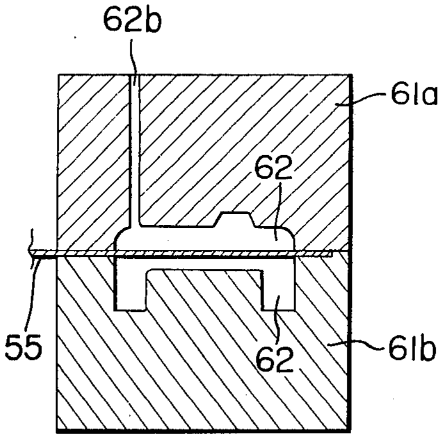
Figure 13E:
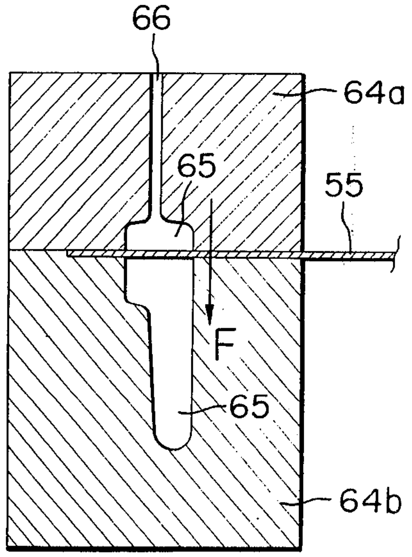

Subsequently, as shown in FIG. 13E, a plurality of leaf spring base plates 55 with the hammer portions 57 having been so formed integrally therewith are securely disposed between the upper and lower metallic mold halves 64*a* and 64*b* for forming the base 58 in such a manner that the leaf springs 54*a* and 54*b* of the leaf spring base plate 55 lie on a common plane and at equal intervals, thereafter plastic material is poured into a base forming cavity 65 through a channel 66 to form the base 58 as shown in FIG. 13C. Thereafter, the molded unit is cut along dotted lines 59–59' and 60–60' to remove the edge portions 56*a* and 56*b,* thus forming the desired hammer unit as already described. In this manner, the hammer portion is pre-formed for each pair of leaf springs and the base is commonly formed for a plurality of pairs of leaf springs, each having such a hammer portion. In so contructing the hammer unit, the metal molds for forming the hammer portion and the base may be simple in construction without the need to fabricate with very fine pitches and complicated shape as already described. This in turn leads to lower manufacturing cost of the metallic molds and also eliminates any limitations to be imposed on the raw materials to be molded. Further, each spring leg may be a simple, elongated, flat spring piece which is simple in construction and highly precise in dimensions, so that this is effective in obtaining rows of printing hammers as a unit having a uniform swinging characteristic of the hammers at each place, and with the hammers at each place being disposed adjacent one another with a predetermined fine pitch Since the embodiment shown in FIGS. 13A, 13B and 13C is of the type in which the hammer portion and the base are molded separately, it has the advantage that the raw materials to be molded by the two molds can be discretely chosen in accordance with the functions of these hammer and base portions. More specifically, by using a thermosetting resin having less thermal contraction at the time of shaping as the base molding material, it is possible to obtain a printing hammer unit in which each spring leg is precisely held with a predetermined fine pitch in the base portion thereof. Also, by using a thermoplastic resin abundant in elasticity as the molding material for the hammer portion it becomes advantageously possible that the core of an electromagnet can easily be urged in the hammer portion 57 without damaging the same when the core is later to be press-fitted and held in the hammer portion.

All the foregoing embodiments have been described as using plastic materials for the hammer portions and base. In the use of such plastic materials, resin materials of particularly small thermal contraction may be used to shape the hammer portions 15, 44, 51 or 57 and the base 11, 45, 52 or 58. When resin materials of large thermal contraction, such as thermoplastics are used, large pitch errors of the order of from 0.7 to 1.0 mm could be caused between adjacent parts due to contraction of the base especially when the edge portions 27*a,* 27*b,* 41*a,* 41*b,* 42*a,* 49*a,* 56*a,* 56*b* interconnecting the leaf springs 12*a,* 12*b,* 43, 50, 50*a,* 54*a,* 54*b* have been cut off upon completion of molding. In contrast, the use of thermosetting resin material usually suffers less from thermal shrinkage. For example, phenol resin containing 30% glass fiber, would reduce the error down to 0.3mm or less, so that production of the printing hammer unit having high dimensional precision becomes possible.

Also, when resin material is to be poured on one part of the leaf springs placed between the metallic mold halves 28*a* and 28*b,* or 64*a* and 64*b* of the plastics molding machine, it is preferably that the pouring of the resin material into at least the cavity (30,65) of the mold for the base formation be conducted in a manner wherein the injection channel 33 or 36 is open to the base forming cavity 30 or 65 in the mold, so that the resin may flow in the direction of the thickness of the leaf spring (the direction of F in FIG. 6 or FIG. 13E). If the resin material is poured in the direction of the surface of the leaf spring (the direction perpendicular to the plane of FIG. 6 or 13E), the leaf springs located near the resin injection channel will be forced in the direction of flow of the resin under a heavy injection pressure of the resin and the molding will take place under such condition with the result that the leaf springs in each column will be embedded irregularly (not being arranged flush) with respect to the base, which in turn will result in non-uniform swinging movement characteristic of the hammer at each place. In contrast, if the resin material is poured so that the flow is directed toward the surfce side of the leaf springs, or toward the thickness thereof as mentioned above, the positional discrepancy in each leaf spring due to the injection pressure of the resin material will be minimized, whereby the hammer unit with the root of the leaf springs being aligned with respect to the base.

It is recalled that the leaf spring base plate 25, 40*a,* 40*b,* 48*a,* 55 shown in FIGS. 8, 11*C,* 12*B* and 13*C* is cut along the dotted lines 35–35', 37–37', 46–46', 47–47', 53–53', 59–59' and 60–60'. In order, however, to reduce the shearing stress during the cutting, or to eliminate irregularity in the cutting, it is preferably that the portions to be so cut should in advance be made thinner than the remainder.

Figure 14A:
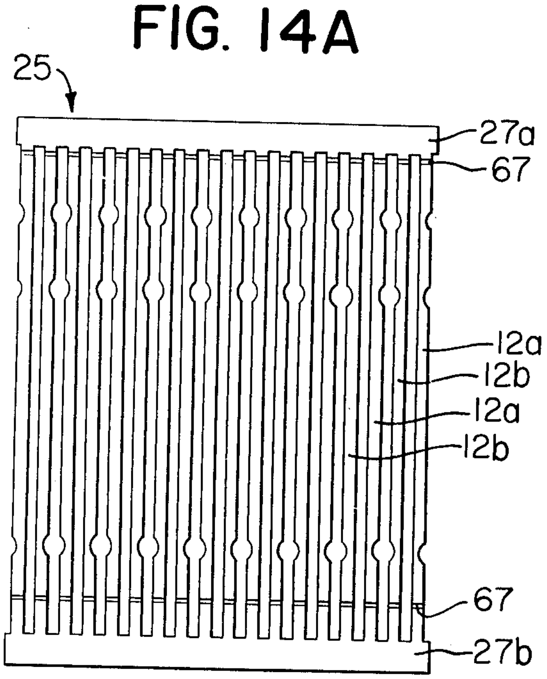
FIGS. 14A and 14B are, respectively, a front view and a partly enlarged side elevational view of the spring base plate, wherein weakening grooves, along which connecting portions may be removed, are shown to be formed.
Figure 14B:
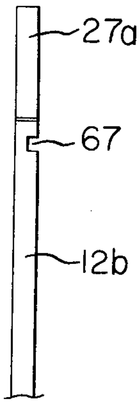

FIGS. 14A and 14B show a form of the leaf spring base plate 25 in which the portions to be cut have been made thinner in thickness by providing gooves 67. Such grooves may be formed by applying an anti-corrosion paint to the leaf spring base plate 25 except for the portions where the grooves 67 are to be made and then by immersing the surface of such leaf spring base plate in etching liquid to etch the plate in those particular portions. In other words, only one surface of the leaf spring base plate may be etched.

Adoption of this one-surface etching to form the grooves 67 may result in satisfactory formation of the generally uniform thin-walled grooves without giving adverse effect such as deformation, etc. to the other portion of the leaf spring base plate.

Also, the notches 34*a* and 34*b*, the provision of which has been described in connection with FIG. 5, may preferably be formed in any other embodiment and, if desired, the notches may be replaced by protrusions.

What is claimed is:

1. A method of making a printing hammer unit comprising the steps of:

a. forming a group of printing hammers by fixedly securing a respective hammer portion to each of a plurality of pairs of resilient members made of electrically conductive material and connected together at connecting portions, and also forming a base by fixedly securing the same onto a portion of said resilient members spaced apart from said hammer portions;

b. removing at least a part of said connecting portions to each pair of break the electrical connection between one of said resilient members and the other resilient member of each pair on which a respective portion is fixedly secured; and c. fixing a magnet member to said hammer portion formed in said printing hammer forming step, said magnet member fixing step being carried out subsequent to said printing hammers forming step or to said connecting portions removing step.

2. A method according to claim 1, wherein said hammer portions and said base are formed of a thermosetting resin.

3. A method of making a printing hammer unit comprising the steps of:

a. forming a group of printing hammers by fixedly securing a respective hammer portion to each of a plurality of pairs of resilient members made of electrically conductive material and connected together at connecting portions, and also forming a base by fixedly securing the same onto a portion of said resilient members spaced apart from said hammer portions;

b. removing at least a part of said connecting portions of each pair to break the electrical connection between one of said resilient members and the other resilient member of each pair on which a respective portion is fixedly secured; and c. forming antislip means at corresponding positions of said resilient members where said hammer portions and said base are secured to prevent said hammer portions and said base from shifting relative to said resilient members.

4. A method of making a printing hammer unit comprising the steps of:

a. forming a group of printing hammers by fixedly securing a respective hammer portion to each of a plurality of pairs of resilient members made of electrically conductive material and connected together at connecting portions, and also forming a base by fixedly securing the same onto a portion of said resilient members spaced apart from said hammer portions; and resilient members made of electrically conductive material and connected together at connecting portions, and also forming a base by fixedly securing the same onto a portion of said resilient members spaced apart from said hammer portions; and b. removing at least a part of said connecting portions of each pair to break the electrical connection between one of said resilient members and the other resilient member of each pair on which a respective portion is fixedly secured, said resilient members and said connecting portions being formed by punching a blank plate member a plurality of number of times.

5. A method of making a printing hammer unit comprising the steps of:

a. forming a group of printing hammers by fixedly securing a respective hammer portion to each of a plurality of pairs of resilient members made of electrically conductive material and connected together at connecting portions, and also forming a base by fixedly securing the same onto a portion of said resilient members spaced apart from said hammer portions; and b. removing at least a part of said connecting portions of each pair to break the electrical connection between one of said resilient members and the other resilient member of each pair on which a respective portion is fixedly secured, said resilient members being preformed with weakening grooves so that removal of said connecting portions, during said second step, may be effected along said weakening grooves.

6. A method according to claim 5 wherein said weakening grooves are formed by one-surface etching.

7. A method of making a printing hammer unit comprising the steps of:

a. forming a group of printing hammers by fixedly securing a respective hammer portion to each of a plurality of pairs of b. removing at least a part of said connecting portions of each pair to break the electrical connection between one of said resilient members and the other resilient member of each pair, on which a respective portion is fixedly secured, said base being formed, during said first step a), by pouring a resin material into a metal mold having a molding cavity in the shape of said base, and said resin material being poured in the direction of the thickness of said resilient members.

8. A method of making a printing hammer unit comprising the steps of:

a. forming a plurality of substantially parallel slits in an electrically conductive plate member to construct a plurality of substantially parallel resilient members and a pair of connecting portions to connect said resilient members together at both ends thereof;

b. fixedly providing a hammer portion made of a resin material on each pair of said resilient members at one portion thereof, and a base also made of resin material on all of said resilient members and at another portion thereof;

c. removing at least one of said connecting portions which is adjacent to said hammer portions, and removing a portion of said plate member opposite to said hammer portions with respect to said base, to thereby break the electrical connection between each pair of said resilient members, to which a hammer portion is secured; and d. fixing a magnet member to said hammer portion formed in said printing hammer forming step, said magnet member fixing step being carried out subsequent to said printing hammers forming step, or to said connecting portions removing step.

9. A method of making a printing hammer unit comprising the steps of:

a. forming a group of hammers by arranging a plurality of spring base plates, each having a plurality of resilient members mutually spaced apart and connected together by connecting portions in such a manner that the resilient members thereof may be alternately positioned, and fixedly providing a plurality of hammer portions on one part of said resilient members, one hammer portion being secured to each of said plurality of resilient members, and also forming a base on another part of said resilient members spaced apart from said hammer portions and being integrally secured thereto; and b. removing at least one of said connecting portions in said spring base plates which is adjacent to said group of hammer portions.

10. A method according to claim 9, wherein each of said spring base plates comprises a plurality of substantially parallel resilient members and a pair of connecting portions to connect said resilient members together at both end portions thereof, and said spring base plates being formed by providing a plurality of substantially parallel slits in a plate member, and said hammer portions and said base are formed on a pair of said parallel resilient member in said spring base plates.

11. A method according to claim 10, wherein at least one of said spring base plates is bent at one portion thereof so as to dispose the resilient members belonging to the respective spring base plates in substantially a common plane during the formation of said hammer portions and said base.

12. A method according to claim 9, wherein each of said spring base plates comprises a plurality of resilient members spaced apart and securely connected together by a single connecting portion, and a pair of said spring base plates are disposed in opposed relationship, and the hammer portions and the base portions are provided on said pair of spring base plates.

13. A method of making a printing hammer unit comprising the steps of:

a. securing a hammer portion to each one of a plurality of resilient members of a spring base plate comprising a plurality of spaced apart resilient members connected together by connecting portions, and forming a base on a plurality of said resilient members, on which said hammer portions are secured; and b. removing a part of said connecting portions from said spring base plate.

14. A method according to claim 13, wherein said spring base plate comprises a pair of resilient members and a pair of connecting portions to connect said pair of resilient members at both end parts thereof.

15. A method of making a printing hammer unit comprising steps of:

a. forming a group of hammers, each hammer being fixedly secured on each of a plurality of resilient means which are mutually connected by connecting means, and also forming a base to integrally fix said resilient means at a position spaced apart from said group of hammers;

b. removing said connecting means which is adjacent to said hammers so that the hammers formed on each said resilient means may be individually movable with respect to said base; and c. fixing a magnetic member to each hammer.

16. The method according to claim 15, wherein antislip means are formed at corresponding positions of said resilient means where said hammers and said base are secured to prevent said hammers and said base from shifting relative to said resilient means.

17. The method according to claim 15, wherein said resilient means are pre-formed with weakening grooves so that removal of said connecting portions, during said second step, may be effected along said weakening grooves.

* * * * *

UNITED STATES PATENT AND TRADEMARK OFFICE
CERTIFICATE OF CORRECTION

PATENT NO. : 4,044,455

DATED : August 30, 1977

INVENTOR(S) : SATOSHI WATANABE, et al.

It is certified that error appears in the above-identified patent and that said Letters Patent are hereby corrected as shown below:

Column 5, line 31, after "accurately" insert -- maintained --.

Column 7, line 9, change "beammer" to -- hammer --.

Column 9, line 35, change "to each pair of" to -- of each pair to --.

Column 10, lines 8 to 13, delete "resilient members made . . . . from said hammer portions; and";

Column 10, line 47, after "pairs of" insert -- resilient members made of electrically conductive material and connected together at connecting portions, and also forming a base by fixedly securing the same onto a portion of said resilient members spaced apart from said hammer portions; and --

Signed and Sealed this

*Fourteenth* Day of *March 1978*

[SEAL]

*Attest:*

RUTH C. MASON
*Attesting Officer*

LUTRELLE F. PARKER
*Acting Commissioner of Patents and Trademarks*